United States Patent [19]
Hsu et al.

[11] Patent Number: 5,847,246
[45] Date of Patent: Dec. 8, 1998

[54] FLUID HEAT TRANSFER MEDIUM AND HEAT TRANSFER PROCESS

[75] Inventors: James T. Hsu, Bethlehem, Pa.; Daniel J. Loikits, 5250 W. Coplay Rd., Whitehall, Pa. 18052

[73] Assignee: Daniel J. Loikits, Whitehall, Pa.

[21] Appl. No.: 520,016

[22] Filed: Aug. 28, 1995

[51] Int. Cl.[6] .............................. C09K 5/00; C07C 7/20
[52] U.S. Cl. .................. 585/1; 585/26; 585/355; 252/73
[58] Field of Search ................ 585/1, 24, 25, 585/26, 27, 355; 62/7; 252/73; 165/104.19

[56] References Cited

U.S. PATENT DOCUMENTS

| | | | |
|---|---|---|---|
| 3,597,355 | 8/1971 | Hsu | 252/73 |
| 3,695,056 | 10/1972 | Glyn et al. | 62/168 |
| 3,856,492 | 12/1974 | Klass | 62/58 |
| 5,259,198 | 11/1993 | Viegas et al. | 62/7 |
| 5,305,825 | 4/1994 | Roehrich et al. | 165/64 |
| 5,311,927 | 5/1994 | Taylor | 165/64 |
| 5,512,084 | 4/1996 | Martinez | 95/199 |

*Primary Examiner*—Michael Lewis
*Assistant Examiner*—Alexander G. Ghyka
*Attorney, Agent, or Firm*—Sanford J. Piltch

[57] ABSTRACT

A fluid heat transfer medium and process employing composite mixtures of monocyclic and bicyclic terpenes useful for heat transfer processes in a temperature range down to approximately −165° F., where the fluid heat transfer medium maintains its liquid phase.

26 Claims, 5 Drawing Sheets

Fig. 2

Fig. 3

FLUID HEAT TRANSFER MEDIUM AND HEAT TRANSFER PROCESS

BACKGROUND OF THE INVENTION

This invention relates to heat transfer processes at low temperatures, to low temperature heat transfer fluids, and more particularly, to processes for the transfer of thermal energy at temperatures significantly below zero Fahrenheit by means of a specially formulated low temperature heat transfer fluid.

There are many conventional heat transfer processes which act to transfer thermal energy to or from an object through the physical contact with a heat transfer fluid which is either at a temperature hotter or colder than the object. A number of organic fluids have been used as such heat transfer fluids for high temperature heat transfer processes. Low molecular weight alcohols, ketones and halogenated hydrocarbons have been used for low temperature heat transfer processes.

Low temperature heat transfer processes continue to have difficulties caused by the volatility, toxicity, flammability, foaming or low temperature viscosity changes of conventional low temperature organic heat transfer fluids. Some conventional low temperature heat transfer fluids, such as acetone, absorb any moisture with which they may contact. The heat transfer processes employing such fluids may adversely affect low temperature heat transfer processes. The efficiency of the thermal energy transfer process is reduced by viscosity increases and gelation, which lead to a clogging of transfer lines or other parts of the heat transfer apparatus which will interrupt or impede fluid circulation.

One class of heat transfer fluids identified for lower temperature heat transfer processes (between 0° F. and –142° F.) are certain chemical compounds of the class of monocyclic terpenes. U.S. Pat. No. 3,597,355 describes the use of monocyclic terpenes as a class and d-limonene in particular as being useful for low temperature applications employing heat transfer fluids. The class of monocyclic terpenes is described as consisting of limonene, dipentene, terpinolene, α, β and γ terpinenes, among others. This patent describes d-limonene as being particularly preferred because of its characteristic properties. However, the patent does not describe the chemical composition of the other terpenes and it limits its teaching to the use of a single monocyclic terpene as a heat transfer fluid for use in heat transfer processes. Such a heat transfer process might involve the circulation, by means of a pump or convection, in a conduit system in heat transfer contact with an apparatus from which heat is to be removed. The heat transfer fluid circulated is maintained at a temperature lower than that of the apparatus to be cooled by a suitable cooling mechanism.

U.S. Pat. No. 3,597,355 describes monocyclic terpenes as being useful at low temperatures because of lower viscosity at those temperatures. This patent also describes monocyclic terpenes as exhibiting relatively little viscosity change over the entire liquid phase temperature range. Additionally, monocyclic terpenes have low surface tensions and display excellent wetting of metallic and non-metallic surfaces, properties which enhance heat transfer efficiency and minimize ice formation on such surfaces.

The specific teaching of U.S. Pat. No. 3,597,355 is the use of a single monocyclic terpene for use as a heat transfer fluid. Since the discovery of the invention recited in this patent, orange oil and commercially available limonene (d- or l-) have become significantly more expensive than what was available in the 1970's. Furthermore, the purity of the naturally occurring limonene, as stated in the patent, is suitable for use as a heat transfer medium without further refinement. However, the patent continues by stating that it is usually desirable to subject naturally occurring orange oil to further distillation to provide relatively pure d-limonene for use as the claimed heat transfer fluid. It has been found from the teachings of this patent that relatively pure limonene reduces the efficiency of the heat transfer fluid at temperatures below –120° F. At such temperatures, the viscosity of the fluid increases and the compound begins to gel at temperatures below –140° F. Such gelation and significant increase of viscosity limits the use of single monocyclic terpenes (e.g. relatively pure d-limonene) at such low temperatures.

U.S. Pat. No. 3,695,056 further describes the concept of combining d-limonene with carbon dioxide as a low temperature refrigerant. U.S. Pat. No. 3,597,355 teaches the use of d-limonene as a heat transfer fluid for cooling or freezing products, such as protein materials. In both patents, the liquid carbon dioxide is injected into the d-limonene heat transfer fluid to extract heat therefrom. In this case, d-limonene has been cooled to temperatures ranging between –20° F. to –100° F.

U.S. Pat. Nos. 5,259,198, 5,305,825, and 5,311,927 disclose the fluid of carbon dioxide with limonene and use the resulting fluid as air conditioning or refrigeration in a cryogenic application. Among these patents, only monocyclic terpene limonene was mentioned as the heat transfer fluid.

What is needed is an improved low temperature system which avoids the above mentioned drawbacks. It is, therefore, an object of the present invention to provide an improved heat transfer process having improved performance at low temperatures and an increased operational temperature range without significant increase in viscosity of the heat transfer fluid.

It is also an object of the present invention to maintain the properties of the heat transfer fluid so that its viscosity does not significantly increase due to the reduction of temperatures substantially below 0° F. This would cause gelation of the fluid and potentially clog transfer lines or other portions of a heat transfer apparatus, interrupting or impeding the circulation of the heat transfer medium.

It is a further object of the present invention to combine monocyclic and bicyclic terpenes in a mixture within certain preferred ranges to maintain the viscosity of the heat transfer fluid mixture at temperatures lower than that of single monocyclic terpene, heretofore used as heat transfer fluids.

SUMMARY OF THE INVENTION

The heat transfer fluid of the present invention is comprised of a mixture selected from a group of mixtures containing at least two monocyclic terpenes, at least two bicyclic terpenes, or at least one monocyclic terpene and at least one bicyclic terpene. Regardless of the selection, the respective components (monocyclic or bicyclic terpenes) are provided in an effective amount to retain the liquid phase of the mixture comprising the heat transfer fluid at a temperature in the range from about 0° F. to between about –110° F. and –165° F. The monocyclic terpene used in any of the mixtures and comprising the heat transfer fluid may be selected from the group of monocyclic terpenes listed in Table 1. The bicyclic terpene used in any of the mixtures and comprising the heat transfer fluid may be selected from the group of bicyclic terpenes listed in Table 2.

The preferred monocyclic terpene of the heat transfer fluid may be selected from the group of monocyclic terpenes comprising d-limonene, terpinolene, α-terpinene or γ-terpinene. The preferred bicyclic terpene of the heat transfer fluid may be selected from the group of bicyclic terpenes comprising 3-carene, sabinene, α-pinene or camphene. The preferred low temperature operating range of the mixture comprising the heat transfer fluid is in the range of about −110° F. to −165° F. The preferred mixture comprising the heat transfer fluid is a mixture comprised of at least one monocyclic terpene and at least one bicyclic terpene in which the mixture is comprised of about 10% to 90% by volume of the at least one monocyclic terpene and by about 90% to 10% by volume of the at least one bicyclic terpene.

The composite mixture of monocyclic and bicyclic terpenes which is used as a heat transfer fluid has the physical characteristics of being capable of retaining its liquid phase within a range of concentrations at within a temperature range from 0° F. down to approximately to −165° F. For example, the composite mixture being comprised of both monocyclic and bicyclic terpenes is essentially comprised of d-limonene and terpene Mixture A. It is preferred that the concentration of the terpene Mixture A in d-limonene varies within the approximate range of 14% to 66% by volume, and has a preferred low temperature operating range temperature in the approximate range of 0° F. to −165° F.

The present invention also encompasses a process for transferring heat by means of an organic heat transfer fluid comprised of the composite mixture which is capable of retaining its liquid phase within the described range of concentrations and temperatures. For example, the heat transfer fluid comprises a mixture of both monocyclic and bicyclic terpenes which essentially consist of d-limonene and terpene Mixture A. The concentrations of the terpene Mixture A in d-limonene of the heat transfer fluid vary within the approximate range of 14% to 66% by volume, and has a preferred low temperature operating temperature in the approximate range of 0° F. to −165° F.

The low temperature heat transfer process using an organic, terpene-based, heat transfer fluid comprises the following steps: contacting a heat transfer fluid in heat exchange relation with a cooling fluid to cool the heat transfer fluid to a low temperature between about 0° F. and −165° F.; contacting the cooled heat transfer fluid in heat exchange relation with an object to be cooled to absorb heat into the heat transfer fluid from the objects; recirculating the heat transfer fluid in heat exchange relation with the cooling fluid and in heat exchange relation with the object to be cooled until substantially complete cooling of the object is achieved.

The heat transfer fluid utilized in the process comprises a mixture of both monocyclic and bicyclic terpenes which essentially consist of d-limonene and terpene Mixture A. The concentrations of the terpene Mixture A in d-limonene of the heat transfer fluid vary within the approximate range of 14% to 66% by volume, and has a preferred range of 0° F. to −165° F.

The process described above in which the cooling effect is obtained from the evaporation of a cryogenic fluid such as liquid nitrogen, liquid carbon dioxide, or a refrigerant in a mechanical refrigeration system. The process is operated at a heat transfer fluid temperature range of about 0° F. to between about −110° F. and −165° F. The monocyclic terpene of this heat transfer fluid is selected from the group of monocyclic terpenes listed in Table 1 and the bicyclic terpene is selected from the group of bicyclic terpenes listed in Table 2.

The preferred heat transfer fluid described above is a mixture of at least one monocyclic terpene and one bicyclic terpene which comprises about 10% to 90% by volume of the monocyclic terpene and about 90% to 10% by volume of the bicyclic terpene. The most preferred fluid comprises a mixture of d-limonene, terpinolene, α-terpinene, γ-terpinene, 3-carene, sabinene, α-pinene and camphene.

BRIEF DESCRIPTION OF THE DRAWINGS

For the purpose of illustrating the invention, forms are shown in the drawings which are presently preferred. It must be understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and it is made solely for the purpose of illustrating the general principles of the invention. The various features and advantages of the present invention may be more readily understood with reference to the following detailed description taken in conjunction with the accompanying drawings.

In order to illustrate this invention, the classification of terpene hydrocarbons needs to be described. The term "terpenes" was originally applied to cyclic hydrocarbon structures with the empirical formula $C_{10}H_{16}$ or to their derivatives which occur in the essential oils of plants. As knowledge of the chemistry of the terpene field developed, compounds related both chemically and biogenetically to the $C_{10}H_{16}$ hydrocarbons have been identified. Some natural products have been synthesized and other synthetic compounds resemble known terpene structures. Consequently, the term "terpene hydrocarbons" includes not only the numerous $C_{10}H_{16}$ hydrocarbons, but also their hydrogenated derivatives and other hydrocarbons possessing similar fundamental chemical structures. They may be acyclic or cyclic, simple or complex, and of natural or synthetic origin. The cyclic terpene hydrocarbons may be further classified as monocyclic, bicyclic, or tricyclic. Many of their carbon skeletons have been shown to consist of multiples of the isoprene nucleus, $C_5H_8$. In the present invention, monocyclic terpenes and bicyclic terpenes are identified for the applications of low temperature heat transfer fluids. The monocyclic terpenes are known to include the compounds listed in Table 1.

TABLE 1

MONOCYCLIC TERPENES

| | |
|---|---|
| ρ-menthane | carvomenthene |
| menthene | dihydroterpinolene |
| dihydrodipentene | α-terpinene |
| γ-terpinene | α-phellandrene |
| pseudolimonene | limonene |
| d-limonene | l-limonene |
| d,l-limonene | isolimonene |
| terpinolene | isoterpinolene |
| β-phellandrene | β-terpinene |
| cyclogeraniolane | pyronane |
| α-cyclogeraniolene | β-cyclogeraniolene |
| γ-cyclogeraniolene | methyl-γ-cyclogeraniolene |
| cyclodihydromyrcene | α-pyronene |
| β-pyronene | γ-pyronene |
| 1-ethyl-5,5-dimethyl-1,3-cyclohexadiene | |
| 2-ethyl-6,6-dimethyl-1,3-cyclohexadiene | |
| 2-ρ-menthene | 1(7)-ρ-menthene |
| 2,4-ρ-menthadiene | 2,5-ρ-menthadiene |
| 1(7),4(8)-ρ-menthadiene | 3,8-ρ-menthadiene |
| 1,2,3,5-tetramethyl-1,3-cyclohexadiene | |
| 1,2,4,6-tetramethyl-1,3-cyclohexadiene | |
| 1,6,6-trimethylcyclohexene | 1,1-dimethylcyclohexane |

It is contemplated that the above listing of monocyclic terpenes also includes their derivatives. These derivatives are additional forms of the monocyclic terpenes listed in Table 1. Monocyclic terpenes may be readily formed from acyclic terpenes by ring closure from bicyclic terpenes by ring fission. A monocyclic terpene contains a six-carbon ring and may be considered a derivative of either cyclohexane or benzene with a common base carbon ring structure $C_{10}H_{16}$. The various derivatives fall into a classification of either Type A or Type B. The Type A group of monocyclic terpenes may be considered derivatives from menthane (isopropylmethylcyclohexane) or from cymene (isoprophylmethylbenzene), all of which may be considered propyl compounds based on the carbon ring structure. The Type B monocyclic terpenes may be considered derivatives of dimethylcyclohexane, for which there is no trivial name, and may be considered derivatives of methyl compounds based upon the carbon ring structure.

What we have just described is the restructuring of the molecule which is a first type of derivative. The second type of derivative adds an atom or functional group or another molecule to the terpene compound, for example: oxygenated, hydrogenated, halogenated, nitrogenated and terpenes modified with silicon based compounds; functional groups, OH, ester, ketones, amine, amide, amino, carboxyl and the like.

The bicyclic terpenes are known to include the compounds listed in Table 2.

TABLE 2

BICYCLIC TERPENES

| | |
|---|---|
| norsabinane | northujene |
| 5-isopropylbicyclo[3.1.0]hex-2-ene | β-thujene |
| thujane | |
| α-thujene | sabinene |
| 3,7-thujadiene | norcarane |
| 2-norcarene | 3-norcarene |
| 2,4-norcaradiene | carane |
| 2-carene | 3-carene |
| β-carene | nonpinane |
| 2-norpinene | apopinane |
| apopinene | orthodene |
| norpadiene | homopinene |
| pinane | 2-pinene |
| 3-pinene | β-pinene |
| verbenene | homoverbanene |
| 4-methylene-2-pinene | norcamphane |
| apocamphane | camphane |
| α-fenchane | α-fenchene |
| santenane | santane |
| norcamphene | camphenilane |
| fenchane | isocamphane |
| β-fenchane | camphene |
| β-fenchene | 2-norbornene |
| apobornylene | bornylene |
| 2,7,7-trimethyl-2-norbornene | santene |
| camphenilene | isofenchene |
| isocamphodiene | 1,2,3-trimethyl-2-norbornene |
| 2,5,5,-trimethyl-2-norbornene | |

As in the case of the monocyclic terpenes, it is contemplated that the above listing of bicyclic terpenes also includes their derivatives. The various derivatives which may be classified as bicyclic terpenes fall into four types: thujane (sabinane), carane, α-pinane and thujane (camphane), each designating different types of bicyclic structures. The bicyclic terpene structures, also consisting of the basic chemical unit $C_{10}H_{16}$, more closely resemble the menthane Type A monocyclics and may be considered to be derivatives of propyl compounds with carbon ring structures containing a gem-dimethyl configuration with either an isopropyl group or a hexane or hectane group based upon the carbon ring structure. As above, this describes the first derivative type for the bicyclic terpene compounds. The second derivative type described in connection with the monocyclic terpenes also describes the second derivative type for bicyclic terpenes. The detailed structure of these terpene hydrocarbons are described in "Nomenclature for Terpene Hydrocarbons", "System of Nomenclature for Terpene Hydrocarbons" (American Chemical Society), 1955, which is incorporated herein by reference.

Experiments were carried out to confirm the earlier data compiled in various texts concerning the freezing and melting points of monocyclic terpene d-limonene. Commercial d-limonene was obtained and controlled experiments were conducted by placing the d-limonene in a low temperature bath having stirrers or agitators extending down into the solution to create motion within the solution to simulate flow characteristics. As the temperature in the bath was lowered, the d-limonene formed a gel phase at temperatures below −120° F. It was observed that sudden gelation occurred at or just below −130° F. Upon repeating the experiment, the gelation point was confirmed to be approximately −130° F. Gelation of commercial d-limonene at the temperature noted would tend to cause a significant increase in the viscosity of the compound and solution. When the temperature difference between the liquid and the cold finger is about 5° F., the liquid might, with gentle agitation, attain a temperature below −160° F. without freezing. But while exposing the liquid to ambient surroundings to raise the temperature, the liquid freezes rapidly. Although this phenomenon is peculiar, it can be reproduced with proper conditions. This will be discussed in greater detail below.

A second terpene mixture was selected for similar testing. This terpene mixture was identified by the source of supply as dipentene. However, dipentene has been described as variously containing many different mixtures of terpene-like compounds so that the exact composition of a chemical mixture identified as dipentene is uncertain.

Dipentene has been described as a mixture of dipentene (or limonene), terpinene, and terpinolene, where each of the compounds is denominated as isomeric p-terpadienes (*Chemical Process Industries*, Shreve, R. N., 3rd Ed., 1967). Since U.S. Pat. No. 3,597,355 has identified dipentene as a monocyclic terpene other than limonene, it was determined that a gas chromatograph analysis of the chemical mixture identified as dipentene was necessary. The gas chromatograph analysis was also designed to determine the validity of the previous belief that the major components of dipentene were d- and l-limonene as described in Fluka catalog, Fluka Chemical AG, 1995, as well as defined in "Nomenclature for Terpene Hydrocarbons", "System of Nomenclature for Terpene Hydrocarbons" (American Chemical Society), p.19, 1995.

The gas chromatograph analysis was undertaken on the sample of the chemical mixture originally identified as dipentene and re-identified as terpene Mixture A. The results showed that the major component in the mixture was not limonene. The results of the gas chromatograph analysis of the composition of the sample are shown in Table 3.

TABLE 3

| Component Chemical Compound | Terpene Mixture A | Commercial d-limonene |
|---|---|---|
| d-limonene | 10% | 95.6% |
| 3-carene | 65% | 0 |
| octanal | [neg.] | 0.4% |
| sabinene | 20% | 0.7% |
| α-pinene | 2.5% | 0.6% |
| myrcene | 2.5% | 2.7% |

[neg. = negligible]
[% by weight]

The various compounds recited in Table 3 may be classified as follows. The d-limonene is a monocyclic terpene; 3-carene, sabinene and α-pinene are bicyclic terpenes; myrcene is an acyclic terpene; and octanal is a non-terpene compound.

The gas chromatograph analysis was repeated three separate times, resulting in the composition of terpene Mixture A which is set forth in Table 3. The commercial d-limonene was also subjected to gas chromatograph analysis which resulted in the determination of the minor constituent components of the relatively pure d-limonene mixture. Therefore, based on the results of the gas chromatograph analysis, commercial d-limonene will be referred to by its principal component, d-limonene, and the chemical mixture identified commercially as dipentene will be referred to as terpene Mixture A, hereinafter.

EXAMPLE 1

Subsequent to the gas chromatograph analysis of terpene Mixture A, this chemical mixture was also subjected to a low temperature bath to determine its freezing and melting points. Upon lowering the temperature of the mixture, terpene Mixture A reached a lower temperature than the d-limonene, approximately −160° F. in the same experimental low temperature bath without gelation. However, terpene Mixture A did begin to form white slush at a later time as the temperature increased to approximately −160° F. to −130° F.

EXAMPLE 2

Although the two principal mixtures, d-limonene and terpene Mixture A, were the principal focus of the experimentation, further experiments with combinations of these two mixtures were carried out. Composite Mixture 1, which is a 2:5 volume ratio mixture of d-limonene to terpene Mixture A, was found to be able to reach −160° F. in the same experimental low temperature bath without gelation. Similar to the results of the experiment with terpene Mixture A, Composite Mixture 1 formed loose white slush or gel blocks later on as the temperature rose to about −140° F. to −130° F.

EXAMPLE 3

Another mixture, Composite Mixture 2 of the two principal mixtures comprising 1:1 volume ratio of d-limonene to terpene Mixture A, was found to be able to also reach −160° F. in the experimental low temperature bath without gelation. More importantly, Composite Mixture 2 did not form loose slush or gel blocks as the temperature rose due to removal of the coolant and exposure to ambient surroundings.

The results of the low temperature experiment with the principal mixtures and Composite Mixtures 1 and 2 are reflected in Table 4 below.

TABLE 4

| Chemical Mixture | Temperature Reached °F. | Observations |
|---|---|---|
| Control: | | |
| Commercial d-limonene | ≈ −130° F. | Experimental bath suddenly turned into white gel with the gel forming around the "cold finger" with individual gel formations having rod-like shapes. Agitation was stopped by the formation of the gel with temperature rapidly increasing from −130° F. to approximately −110° F. |
| Example #1: | | |
| Terpene Mixture A | ≈ −160° F. | The temperature increased from −160° F. to −130° F. Loose white slush formed and agitation continued to run normally. |
| Example #2: | | |
| Composite Mixture 1 (2:5 volume ratio mixture of d-limonene and terpene mixture A) | ≈ −160° F. | No gelation occurred, but as the temperature rose to −130° F., white slush formed in the experimental bath. |
| Example #3: | | |
| Composite Mixture 2 (1:1 volume ratio mixture of d-limonene and terpene mixture A) | ≈ −160° F. | No gelation occurred and no white slush was formed in the experimental bath during the cooling and heating cycles. |

It was determined that the experimental reductions in temperature of Composite Mixtures 1 and 2 reached approximately the same temperature, −160° F., in the experimental unit without gelation of the mixture. The experiments could not continue below this temperature because of heat transfer limitations of the experimental bath and not because the materials under test could not continue to be tested at lower temperatures. Thus far in the experimentation, it was determined that suitable mixtures of monocyclic and/or bicyclic terpenes can attain a temperature of approximately −160° F. without freezing.

Figure 1:
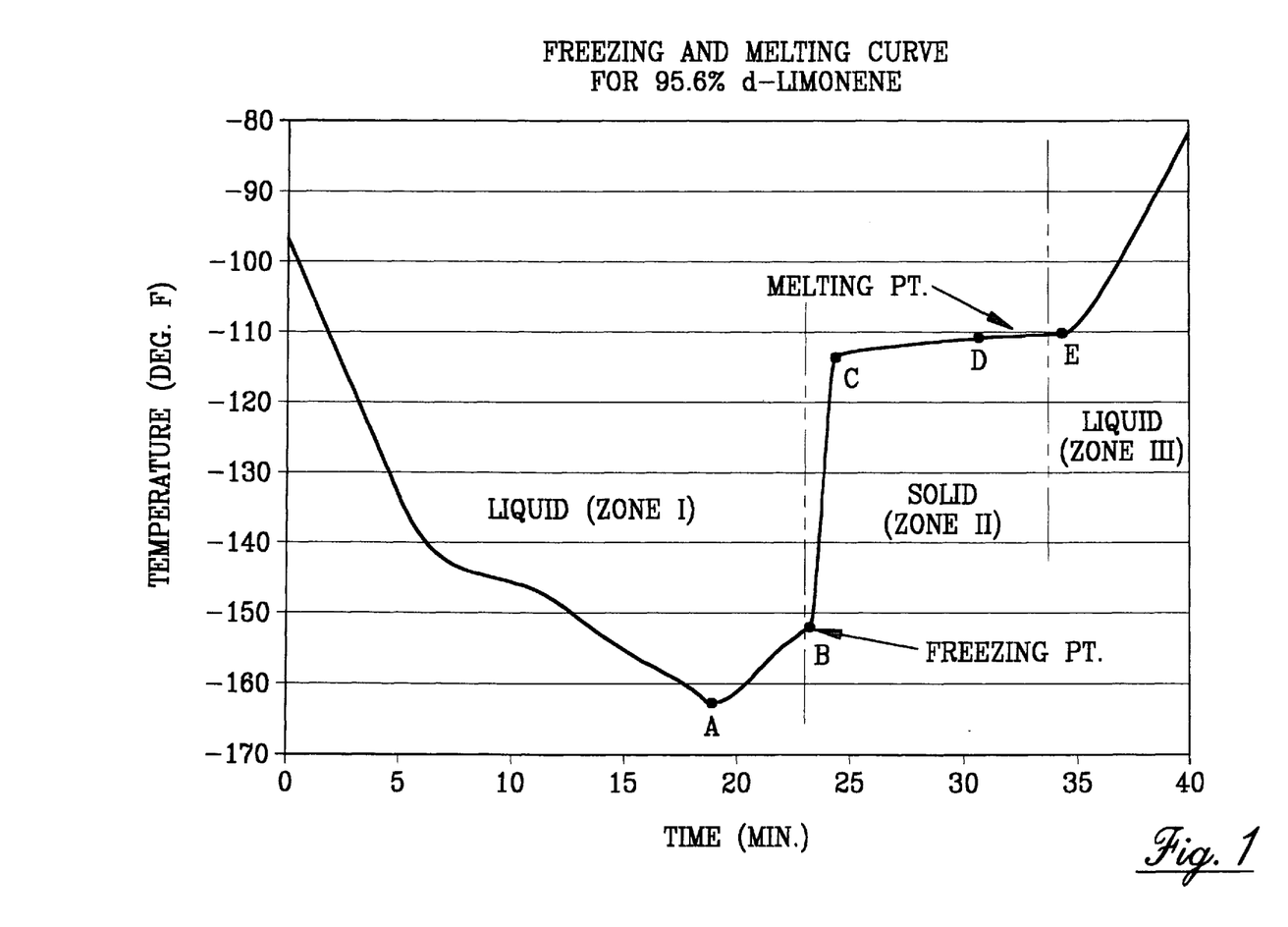
FIG. 1 is a chart showing the experimental freezing and melting temperature curve of pure (95.6% by weight) d-limonene during an observed time period.

It is believed that a discussion concerning the results of the experiment of cooling the commercial or technical grade d-limonene (95.6% by weight d-limonene) would be helpful in understanding the results obtained. Referring to FIG. 1, this chart graphically demonstrates the temperature reduction in degrees Fahrenheit against time for liquid d-limonene. The liquid d-limonene is reduced in temperature in the experimental bath with observation beginning with the liquid temperature at approximately −100° F. After approximately 19 minutes and with proper operating conditions, the liquid is cooled to approximately −163° F., indicated at Point A, where cooling is stopped. The liquid is then allowed to absorb heat from ambient surroundings. At 23 minutes, indicated at Point B, the liquid has slightly increased in temperature to approximately −153° F., the nominal freezing point, where crystal formation begins. This concludes the initial liquid phase of the mixture contained in Zone I of the chart.

Beginning at Point B and continuing for approximately one minute, significant crystallization occurs which is the gelation of the mixture. During this solid phase, shown on the chart as Zone II, heat is given off by the crystallization or solidification of the mixture. The gelation or solidification ends at Point C (24 minutes into the experiment) at approximately −113° F. Ambient external (surrounding environmental) heating occurs during the solid phase between Points C and D which is approximately −110° F. This solid phase exists for approximately seven to eight minutes. Melting begins to occur at Point D and a fairly constant temperature was observed between Points D and E as the mixture reabsorbed heat from the surrounding environment. Point E is the end of the solid phase of the mixture comprising Zone II in the chart.

Point E begins the second liquid phase of the mixture and is shown as Zone III on the chart. Point E shows the melting point of the liquid at approximately −110° F. with a constantly rising temperature. Thus, as the liquid was supercooled to a temperature of −163° F., a freezing point of approximately −153° F. and a melting point of −110° F. were determined.

It was also determined that terpene mixtures produce distinctly different physical properties as compared to individual terpenes. Appropriate mixtures of terpenes can be reduced to temperatures as low as −162° F. without freezing. However, the viscosity of these mixtures varies from significantly lower to slightly higher at the reduced temperatures. It was found that d-limonene has a low viscosity at reduced temperatures and that terpene Mixture A retains a slightly higher viscosity at such temperatures. Thus, since viscosity was determined approximately to be an additive property of various terpene compounds, a mixture could be made of d-limonene and terpene Mixture A such that the resulting composite mixture would not solidify (form a gel or crystallize) at the low temperature −160° F. and, at the same time, minimize the increase in viscosity.

Figure 2:
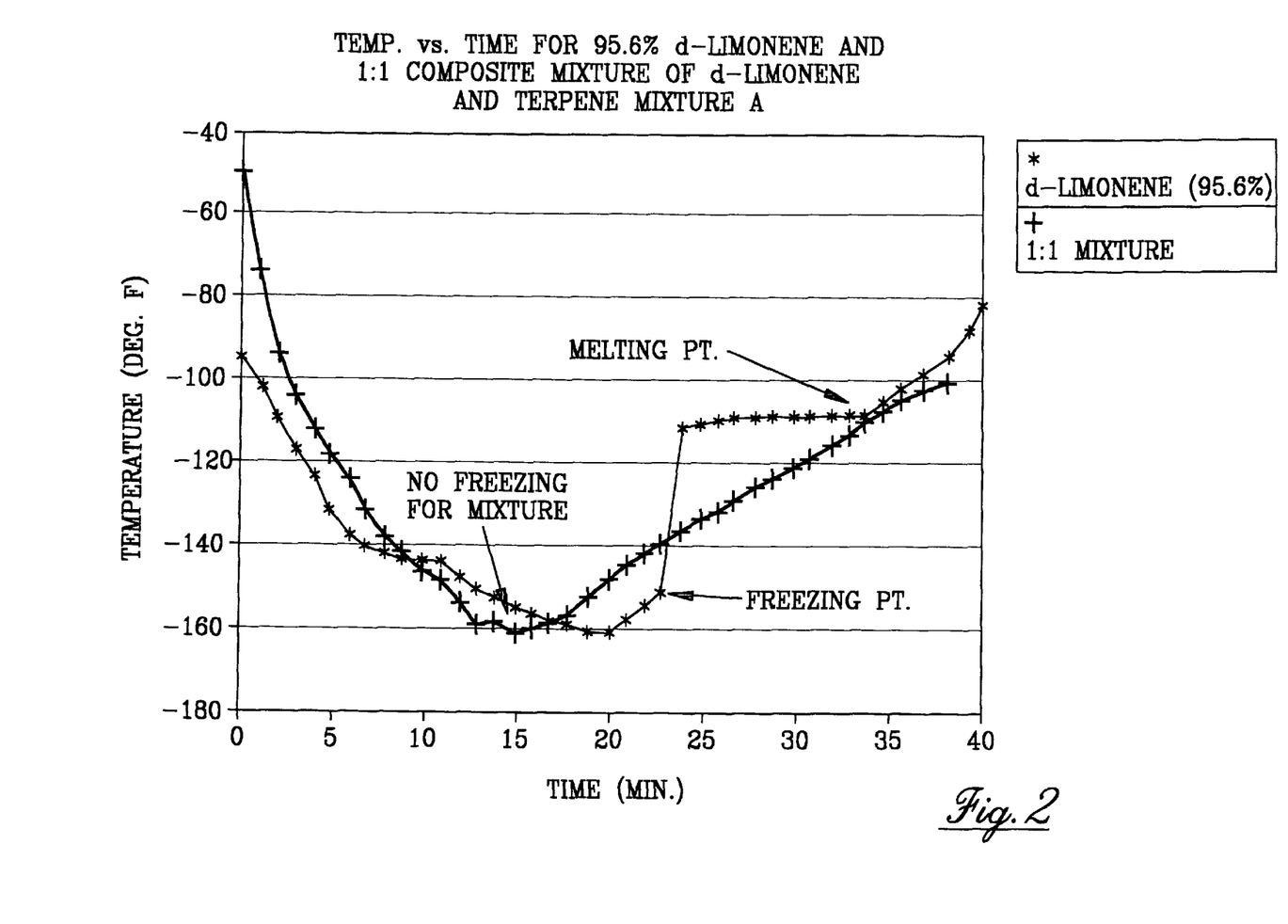
FIG. 2 is a chart showing the experimental freezing and melting temperature curve of pure (95.6% by weight) d-limonene and a mixture of d-limonene and other monocyclic and bicyclic terpenes.

Differing amounts of terpene Mixture A were added to d-limonene. The behavior of the mixtures was studied to determine the preferred concentrations of one mixture to the other in the resulting composite mixture with regard to the solidification and viscosity properties. FIG. 2 shows a temperature vs. time chart of the cooling cycle of d-limonene and Composite Mixture 2, a 1:1 volume ratio mixture of d-limonene and terpene Mixture A. The chart of FIG. 2 resembles the chart depicted in FIG. 1 and it should be noted that the relatively pure d-limonene (commercial/technical grade—95.6% pure by weight) repeated the findings of the determination of freezing and melting points shown in FIG. 1 and described above. Composite Mixture 2 was reduced to substantially the same temperature, −161° F., with no gelation (crystallization or solidification) observed, and no freezing point of the mixture discerned. This experiment was repeated several times using the same volume ratio mixture of the d-limonene and terpene Mixture A with substantially the same results—no freezing of the liquid and no freezing point discerned.

Figure 3:
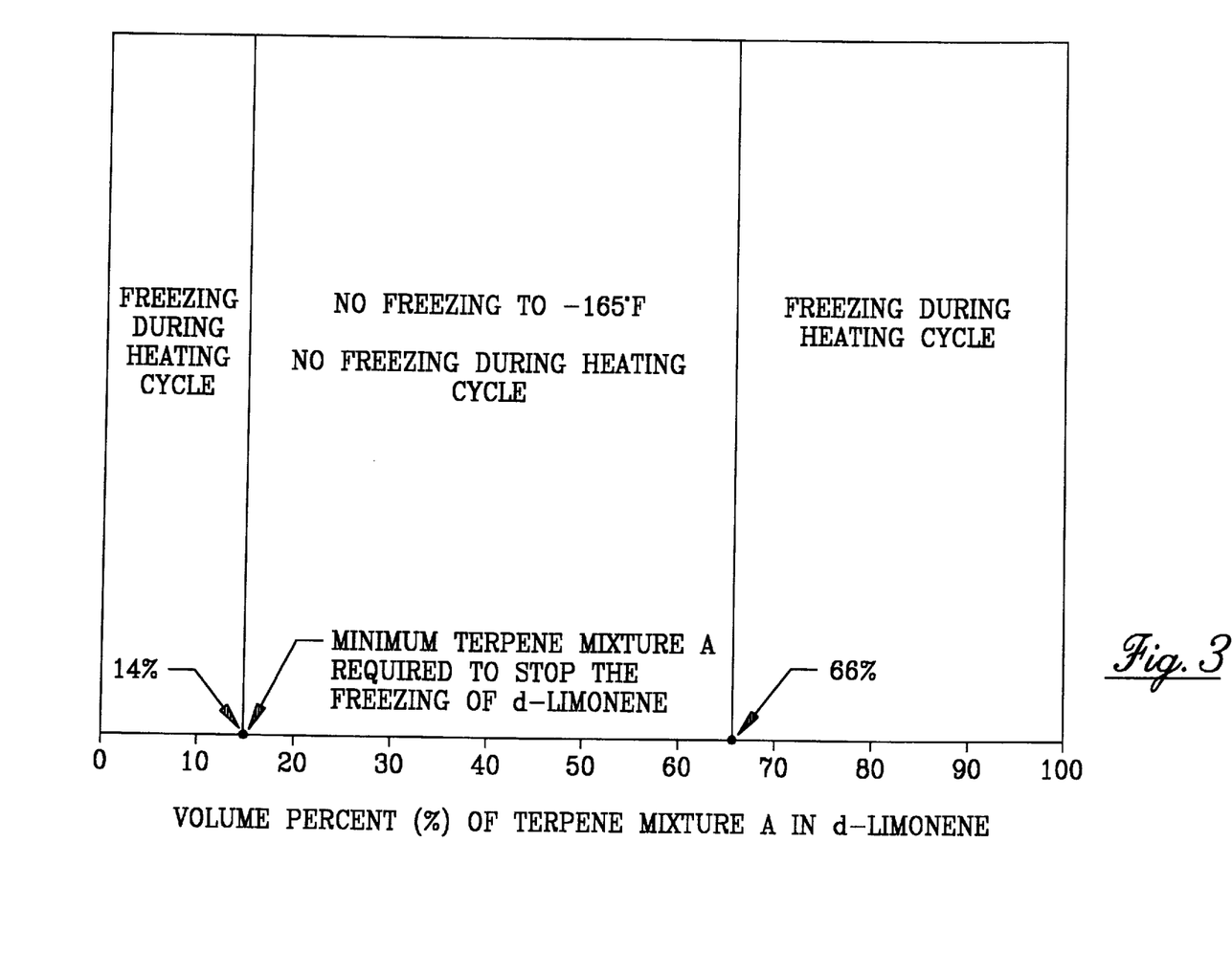
FIG. 3 is a chart depicting the lower threshold concentration and higher threshold concentration of the terpene Mixture A added to d-limonene to achieve a mixture of monocyclic and bicyclic terpenes for a heat transfer fluid.

FIG. 3 depicts the results of the experiments conducted using various amounts of terpene Mixture A being added to d-limonene to observe the gelation or solidification behavior of the liquid. During the cooling cycle, concentrations of less than 14% by volume terpene Mixture A were mixed with d-limonene. No freezing (gelation, crystallization or other solidification) was observed by reducing the temperature down to approximately −163° F. See FIG. 1, Zone I (Liquid). During the heating cycle following the removal of the artificial cooling apparatus, gelation and solidification were observed as discussed in connection with FIG. 1, Zone II (Solid). Likewise, when the concentration of terpene Mixture A exceeded 66% by volume, the same phenomenon occurred, with freezing beginning at approximately −155° F. and continuing rapidly as the solution temperature reached −115° F. as described above in connection with FIG. 1, Zone II (Solid).

However, with concentrations of terpene Mixture A greater than 14% by volume and less than 66% by volume in combination with d-limonene, no gelation, crystallization or other solidification was observed at any time during the experiment when the temperature was reduced to approximately −165° F., and heating with the artificial cooling apparatus being removed. Therefore, a composite mixture of d-limonene and terpene Mixture A, in the appropriate concentrations, remains liquid at temperatures below zero Fahrenheit down to approximately −165° F.

The results determined from the experimental evaluations clearly show that mixtures of two or more monocyclic and bicyclic terpenes maintain their liquid state during the entire cooling and ambient heating process. It is important to note that only the artificial cooling apparatus was removed and that the heating of the liquid which occurs is that from the ambient surrounding environment or from the solidification process, not from any other source of heat. Furthermore, the freezing point of pure (95.6% by weight) d-limonene is not consistent and it varies depending upon impurities and agitation of the environment. However, the melting point of such d-limonene is repeatedly producible at −110° F.

It was also noted that the greater amount of terpene Mixture A which is added to d-limonene, the freezing point of the combination mixture increases and the melting point decreases. As one continues to add additional quantities of the terpene Mixture A to the d-limonene, the freezing point and melting point continue to approach one another until the freezing point and melting point become the same at a particular concentration of terpene Mixture A in d-limonene. Hence, no freezing has been observed at above such threshold concentration of the terpene Mixture A in d-limonene within a defined range of cooling down to a temperature of about −165° F. The lower threshold concentration of the terpene Mixture A in the d-limonene is determined to be approximately 14% by volume, as shown in FIG. 3.

Similarly, above an upper threshold concentration of the terpene Mixture A in d-limonene which was found to be approximately 66% by volume, the characteristics of the terpene Mixture A begin to resurface and a reaction foretelling crystallization or solidification of the liquid again becomes observable. Thus, in the range between the lower threshold concentration and the upper threshold concentration of the terpene Mixture A in d-limonene, the liquid of the composite mixture of monocyclic and bicyclic terpenes is useful as a heat exchange liquid at significantly reduced temperatures in the range below −120° F. to approximately −165° F.

In order to illustrate this invention further, several experiments were performed using different pure terpenes as well as blends of monocyclic and bicyclic terpenes.

EXAMPLE 4

A monocyclic terpene, terpinolene, was subjected to the same low temperature to determine its freezing and melting points. The whole bath turned to a white solid at −134° F. and its melting point was around −95° F.

EXAMPLE 5

A bicyclic terpene, 3-carene, was subjected to the same low temperature bath to determine its freezing and melting points. Solid particles started forming at −90° F. and the whole bath froze at −100° F.

EXAMPLE 6

A bicyclic terpene, α-pinene, was also subjected to the same low temperature bath to determine its freezing and melting points. A solid began to form on the cold finger at −135° F. and at −141° F., but the rest of the bath was still liquid. Heat transfer to the bath was not possible after a solid started forming on the cold finger.

EXAMPLE 7

A 1:1 volume ratio mixture of d-limonene (monocyclic terpene) and terpinolene (monocyclic terpene) was subjected to the same low temperature bath to determine its freezing and melting points. This mixture could be cooled down to −165° F. without any freezing and without any solid formation, also during heating.

EXAMPLE 8

Three different blends of d-limonene (monocyclic terpene) and 3-carene (bicyclic terpene) were subjected to the same low temperature bath to determine its freezing and melting points. A 2:1 volume ratio mixture of d-limonene/3-carene did not freeze during cooling or heating as described in FIG. 1. However, a 1:1 and 1:2 volume ratio mixture of d-limonene/3-carene formed white slush (solid particles) during the heating cycle (as described in FIG. 1, Zone II). There was no solid formation when cooling down to −160° F. During heating, only white slush formed. The rest of the bath was still liquid and the stirrer was free to move.

It is interesting to point out that (from Example 3) based on the composition of 3-carene in terpene Mixture A, 65% by weight, the calculated concentration of 3-carene in d-limonene varies within the approximate range of 9% to 43% by volume, and gelation, crystallization or other solidification could not be observed at any time during the experiment of cooling and heating cycle. The 2:1 volume ratio mixture of d-limonene/3-carene in this example is equivalent to 33% by volume, which is within the range of 9% to 43% by volume.

EXAMPLE 9

Figure 4:
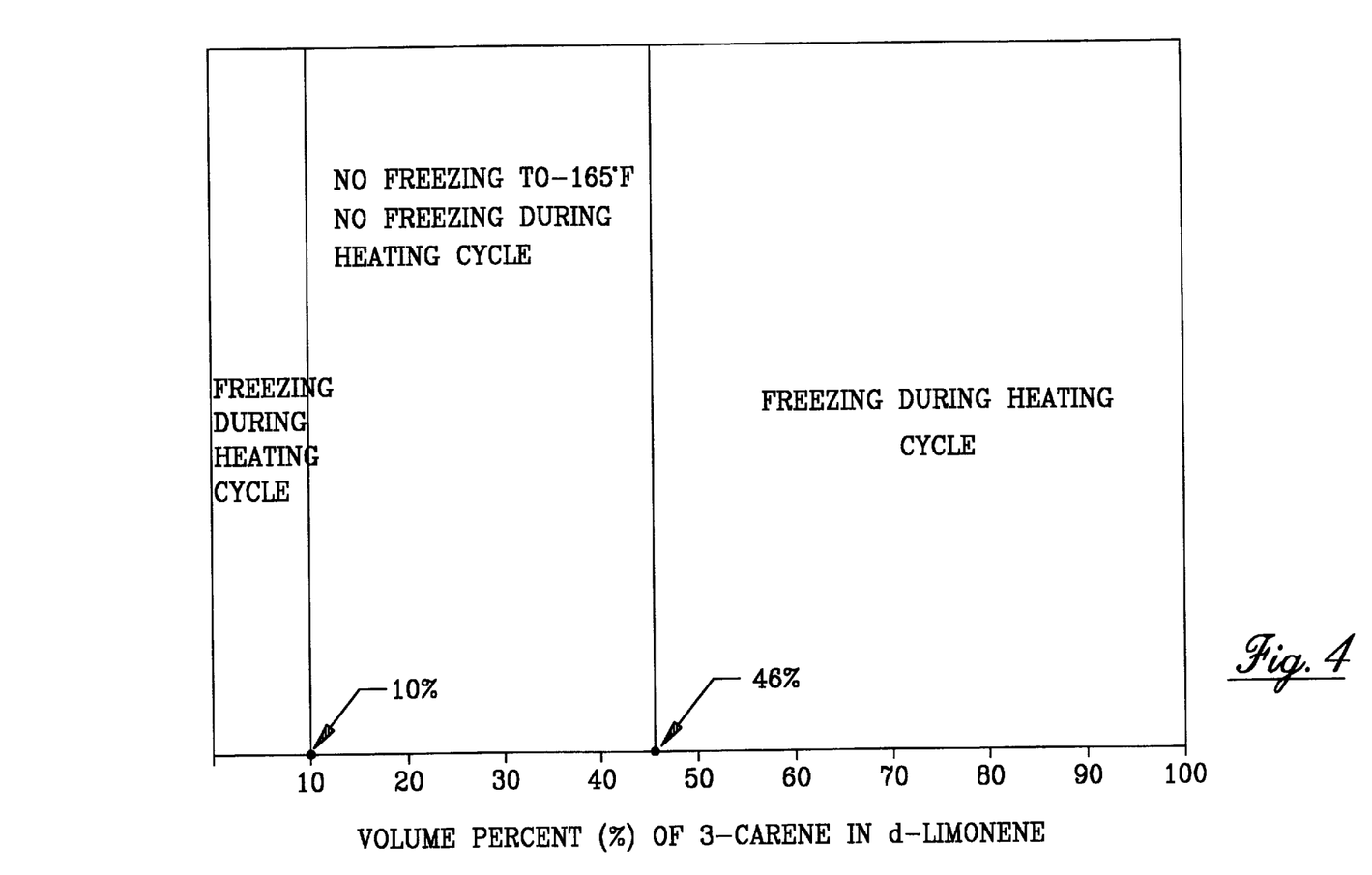
FIG. 4 is a chart depicting the lower threshold concentration and higher threshold concentration of the 3-carene added to d-limonene in order to achieve a mixture of monocyclic and bicyclic terpenes for a heat transfer fluid.

Continuing with the experiment of Example 8, in order to obtain the lower threshold concentration and upper threshold concentration of 3-carene in d-limonene, a series of 3-carene/d-limonene mixtures with different compositions were experimentally tested. Referring to FIG. 4, it was observed that the freezing of d-limonene during the heating cycle could be avoided if the concentration of 3-carene in d-limonene could be raised to 10% by volume (lower threshold concentration) or more. But when the 3-carene concentration in d-limonene went beyond 46% by volume (upper threshold concentration), small particles (loose white slush) formed during the heating cycle, although some part of the bath still remained as liquid. As described in Example 5, pure 3-carene is known to freeze at around −90° F.

In Example 3, the concentration of terpene mixture A in d-limonene between 14% by volume and 66% by volume can stop the freezing during cooling up to −165° F., and also during heating that liquid with heat leakage from the ambient surrounding. Since 3-carene constitutes 65% by weight of the terpene mixture A, it was interesting to see that 10% by volume to 46% by volume 3-carene in d-limonene can inhibit the freezing in a similar way as did the terpene mixture A. This clearly shows that 3-carene played an important role in stopping the freezing of d-limonene. The other components in the terpene mixture A might not play as important a role as 3-carene.

Figure 5:
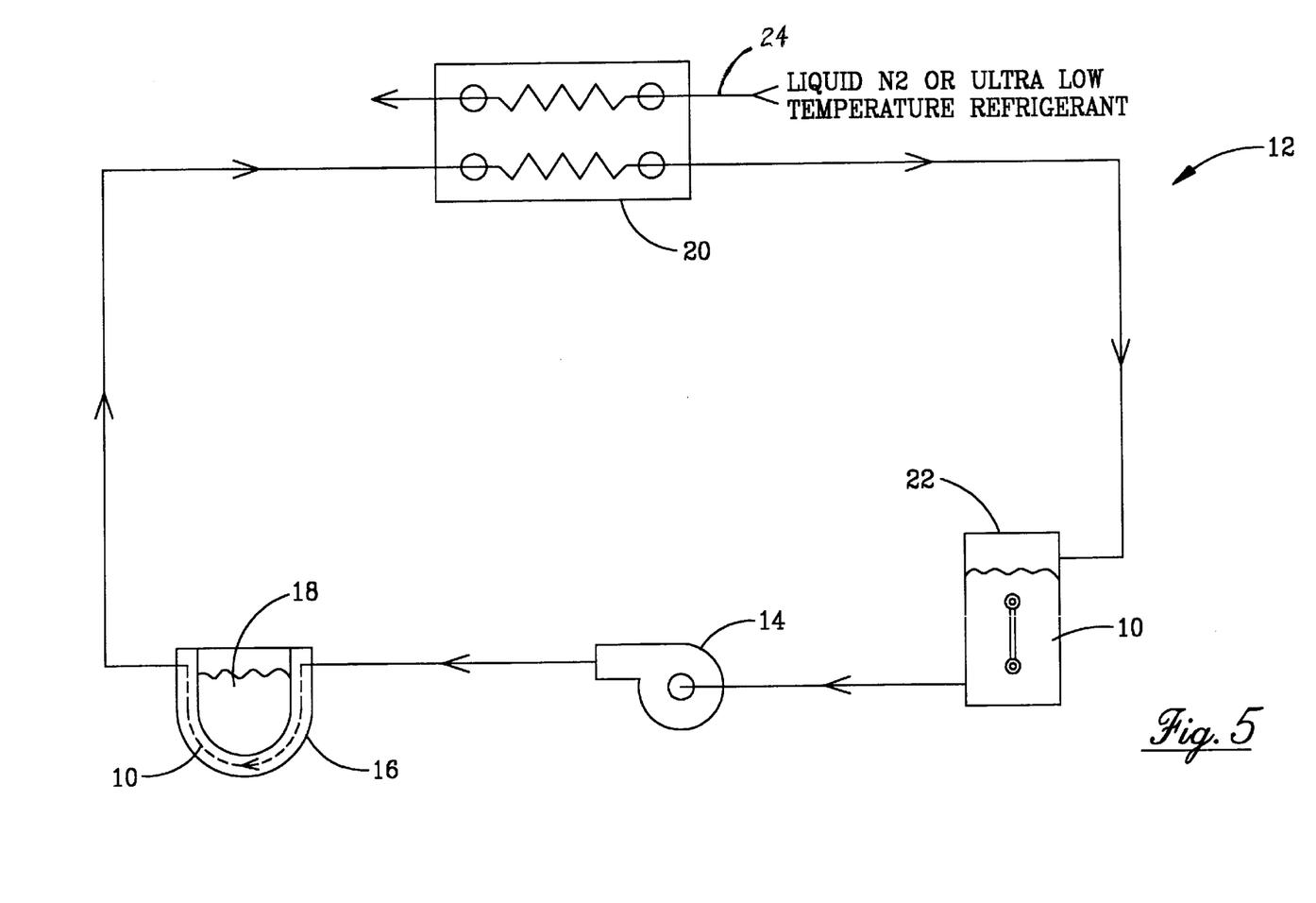
FIG. 5 is a diagrammatic view of a heat transfer system using the heat transfer fluid of the present invention.

In order to illustrate the industrial utility of this invention, an explanation of the application of the mixture of liquid terpenes as a heat transfer fluid is described with reference to FIG. 5. The heat transfer fluid (10) for low temperatures of the present invention can be used in a closed loop cooling circuit which is charged with one of the composite mixtures described above; e.g. 4:1 volume ratio composite mixture of d-limonene and terpene Mixture A (approximately a 20% concentration by volume) which performs as follows.

The closed loop cooling system (12) is comprised of a pump (14), a jacketed vessel (16) holding the object to be cooled (18), a heat exchanger or evaporator (20), and a coolant expansion container (22). The circulation pump (14) draws the liquid (10) from the expansion or storage container (22) and impels the heat transfer fluid (10) through the jacket of the coolant reactor vessel (16) containing the object material (18) which is desired to be cooled to approximately −150° F. The heat transfer fluid (10) passes through the reactor jacket causing the reduction in temperature of the object material (18) and passes to the heat exchanger (20). The heat exchanger (20) removes the absorbed heat transferred from the object material (18) in the cooler or chiller reactor (20) by means of heat extraction or cooling by subjecting the heat transfer fluid (10) to a cryogenic fluid (24) such as liquid nitrogen or other ultra low temperature refrigerant, e.g. R-23, used in a mechanical refrigeration system. The cooled heat transfer fluid (10) now returns to the storage/expansion container (22) for recirculation and reuse in the cooling system.

A temperature control device is used to modulate the flow of the cryogenic fluid or refrigerant (24) to maintain the temperature of the recirculating heat transfer fluid (10) in the range of approximately −160° F. The recirculated heat transfer fluid (10) is again pumped to the reactor jacket (16) at the approximate −160° F. temperature where it continues to remove heat from the object material (18) in the reactor (16). This causes the heat transfer fluid (10) to increase its temperature to approximately −155° F. The process is repeated for as long as is necessary using the heat transfer fluids, with appropriate concentrations within the stated range of the composite mixtures of the monocyclic and/or bicyclic terpenes.

The utility of this patent lies in making available a heat transfer fluid with superior properties and performance over currently marketed products. Unlike existing fluids, the composition of the matter is non-toxic, non-hazardous, and is derived from renewable sources. The product of this patent will provide lower operating temperatures than can be achieved with presently available commercial products. Low temperature heat transfer fluids that can provide safety with low viscosity are of immense value to industries which require very low temperatures for process control, condensation, freeze drying, environmental conditioning, and cold storage. The present invention addresses these needs safely, economically, and in an environmentally responsible manner.

The present invention may be embodied in other specific forms without departing from the spirit or essential attributes thereof. Accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

What is claimed is:

1. A heat transfer fluid comprising a mixture of at least two monocyclic terpenes in which said terpenes are provided in complementary proportional percentage amounts to retain the mixture in its liquid phase at any temperature over the entire range from about 0° F. to about −165° F.

2. The heat transfer fluid of claim 1, in which the monocyclic terpenes are selected from the group of monocyclic terpenes consisting of the following:

ρ-menthane, carvomenthene, menthene, dihydroterpinolene, dihydrodipentene, α-terpinene, γ-terpinene, α-phellandrene, pseudolimonene, limonene, d-limonene, l-limonene, d,l-limonene, isolimonene, terpinolene, isoterpinolene, β-phellandrene, β-terpinene, cyclogeraniolane, pyronane, α-cyclogeraniolene, β-cyclogeraniolene, γ-cyclogeraniolene, methyl-γ-cyclogeraniolene, cyclodihydromyrcene, α-pyronene, β-pyronene, γ-pyronene, 1-ethyl-5,5-dimethyl-1,3-cyclohexadiene, 2-ethyl-6,6-dimethyl-1,3-cyclohexadiene, 2-ρ-menthene, 1(7)-ρ-menthene, 2,4-ρ-menthadiene, 2,5-ρ-menthadiene, 1(7),4(8)-ρ-menthadiene, 3,8-ρ-menthadiene, 1,2,3,5-tetramethyl-1,3-cyclohexadiene, 1,2,4,6-tetramethyl-1,3-cyclohexadiene, 1,6,6-trimethylcyclohexene, 1,1-dimethylcyclohexane and other monocyclic terpene derivatives.

3. The heat transfer fluid of claim 1, in which the low temperature operating range of the mixture is in the range from about −110° F. to −150° F.

4. A heat transfer fluid comprising a mixture of at least two bicyclic terpenes in which said terpenes are provided in complementary proportional percentage amounts to retain the mixture in its liquid phase at a temperature in the range from about 0° F. to between about −110° F. and −165° F.

5. The heat transfer fluid of claim 4, in which the bicyclic terpenes are selected from the group of bicyclic terpenes consisting of the following:

norsabinane, northujene, 5-isopropylbicyclo hex-2-ene, thujane, β-thujene, α-thujene, sabinene, 3,7-thujadiene, norcarane, 2-norcarene, 3-norcarene, 2,4-norcaradiene, carane, 2-carene, 3-carene, β-carene, nonpinane, 2-norpinene, apopinane, apopinene, orthodene, norpadiene, homopinene, pinane, 2-pinene, 3-pinene, β-pinene, verbenene, homoverbanene, 4-methylene-2-pinene, norcamphane, apocamphane, camphane, α-fenchane, α-fenchene, santenane, santane, norcamphene, camphenilane, fenchane, isocamphane, β-fenchane, camphene, β-fenchene, 2-norbornene, apobornylene, bornylene, 2,7,7-trimethyl-2-norbornene, santene, 1,2,3-trimethyl-2-norbornene, isocamphodiene, camphenilene, isofenchene, 2,5,5-trimethyl-2-norbornene and other bicyclic terpene derivatives.

6. The heat transfer fluid of claim 4, in which the low temperature operating range of the mixture is in the range from about −110° F. to −150° F.

7. A heat transfer fluid comprising a mixture of at least one monocyclic terpene and at least one bicyclic terpene in which said terpenes are provided in complementary proportional percentage amounts to retain the mixture in its liquid phase at a temperature in the range from about 0° F. to between about −110° F. and −165° F.

8. The heat transfer fluid of claim 7, in which the at least one monocyclic terpene is selected from the group of monocyclic terpenes consisting of the following:

β-menthane, carvomenthene, menthene, dihydroterpinolene, dihydrodipentene, α-terpinene, γ-terpinene, α-phellandrene, pseudolimonene, limonene, d-limonene, l-limonene, d,l-limonene, isolimonene, terpinolene, isoterpinolene, β-phellandrene, β-terpinene, cyclogeraniolane, pyronane, α-cyclogeraniolene, β-cyclogeraniolene, γ-cyclogeraniolene, methyl-γ-cyclogeraniolene, cyclodihydromyrcene, α-pyronene, β-pyronene, γ-pyronene, 1-ethyl-5,5-dimethyl-1,3-cyclohexadiene, 2-ethyl-6,6-dimethyl-1,3-cyclohexadiene, 2-ρ-menthene, 1(7)-ρ-menthene, 2,4-ρ-menthadiene, 2,5-ρ-menthadiene, 1(7),4(8)-ρ-menthadiene, 3,8-ρ-menthadiene, 1,2,3,5-tetramethyl-1,3-cyclohexadiene, 1,2,4,6-tetramethyl-1,3-cyclohexadiene, 1,6,6-trimethylcyclohexene, 1,1-dimethylcyclohexane and other monocyclic terpene derivatives, and where the at least one bicyclic terpene is selected from the group of bicyclic terpenes consisting essentially of the following:

norsabinane, northujene, 5-isopropylbicyclo hex-2-ene, thujane, β-thujene, α-thujene, sabinene, 3,7-thujadiene, norcarane, 2-norcarene, 3-norcarene, 2,4-norcaradiene, carane, 2-carene, 3-carene, β-carene, nonpinane, 2-norpinene, apopinane, apopinene, orthodene, norpadiene, homopinene, pinane, 2-pinene, 3-pinene, β-pinene, verbenene, homoverbanene, 4-methylene-2-pinene, norcamphane, apocamphane, camphane, α-fenchane, α-fenchene, santenane, santane, norcamphene, camphenilane, fenchane, isocamphane, β-fenchane, camphene, β-fenchene, 2-norbornene, apobornylene, bornylene, 2,7,7-trimethyl-2-norbornene, santene, 1,2,3-trimethyl-2-norbornene, isocamphodiene, camphenilene, isofenchene, 2,5,5-trimethyl-2-norbornene and other bicyclic terpene derivatives.

9. The heat transfer fluid of claim 7, in which the at least one monocyclic terpene is selected from the group consisting of d-limonene, terpinolene, α-terpinene, γ-terpinene, and the at least one bicyclic terpene is selected from the group consisting of 3-carene, sabinene, α-pinene and camphene.

10. The heat transfer fluid of claim 7, in which the at least one monocyclic terpene comprises d-limonene and the at least one bicyclic terpene comprises 3-carene.

11. The heat transfer fluid of claim 7, in which the low temperature operating range is in the range of about −110° F. to −150° F.

12. The heat transfer fluid of claim 7, in which the mixture comprises about 10% to 90% by volume of the at least one monocyclic terpene and from about 90% to 10% by volume of the at least one bicyclic terpene.

13. The heat transfer fluid of claim 12, in which the mixture comprises about 34% to 90% by volume of the at least one monocyclic terpene and from about 66% to 10% by volume of the at least one bicyclic terpene.

14. A heat transfer fluid comprising at least one bicyclic terpene in which said terpenes is provided in complementary proportional percentage amounts to retain the heat transfer fluid in its liquid phase at a temperature in the range from about 0° F. to between about −110° F. and −165° F.

15. The heat transfer fluid of claim 14, in which the one bicyclic terpene is selected from the group of bicyclic terpenes consisting of the following:

norsabinane, northujene, 5-isopropylbicyclo hex-2-ene, thujane, β-thujene, α-thujene, sabinene, 3,7-thujadiene, norcarane, 2-norcarene, 3-norcarene, 2,4-norcaradiene, carane, 2-carene, 3-carene, β-carene, nonpinane, 2-norpinene, apopinane, apopinene, orthodene, norpadiene, homopinene, pinane, 2-pinene, 3-pinene, β-pinene, verbenene, homoverbanene, 4-methylene-2-pinene, norcamphane, apocamphane, camphane, α-fenchane, α-fenchene, santenane, santane, norcamphene, camphenilane, fenchane, isocamphane, α-fenchane, camphene, β-fenchene, 2-norbornene, apobornylene, bornylene, 2,7,7-trimethyl-2-norbornene, santene, 1,2,3-trimethyl-2-norbornene, isocamphodiene, camphenilene, isofenchene, 2,5,5-trimethyl-2-norbornene and other bicyclic terpene derivatives.

16. The heat transfer fluid of claim 14, in which the low temperature operating range of the mixture is in the range from about −110° F. to −150° F.

17. A low temperature heat transfer process using an organic, terpene-based heat transfer fluid, comprising the steps of:

a. contacting the heat transfer fluid in heat exchange relation with a cooling fluid to cool the heat transfer fluid to a low temperature between about 0° F. and −165° F.;

b. contacting the cooled heat transfer fluid in heat exchange relation with an object to be cooled to absorb heat in the heat transfer fluid from the object; and c. repeating steps (a) and (b) until substantially complete cooling of the object, in which process the heat transfer fluid comprises a mixture of at least two monocyclic terpenes, a mixture of at least two bicyclic terpenes, or a mixture of at least one monocyclic terpene and at least one bicyclic terpene in which said terpenes are provided in complementary proportional percentage amounts to retain the mixture in its liquid phase at any temperature over the entire range from about 0° F. to about −165° F.

18. The process of claim 17, in which retained heat is removed from the heat transfer fluid by the evaporation of a cryogenic fluid which fluid is selected from the group consisting of liquid nitrogen, liquid carbon dioxide, or a refrigerant in a mechanical refrigeration system.

19. The process of claim 17, in which the process is operated at a heat transfer fluid temperature range from about 0° F. to between about −110° F. and −165° F.

20. The process of claim 17, in which said monocyclic terpene of the heat transfer fluid is selected from the group of monocyclic terpenes consisting of the following:

ρ-menthane, carvomenthene, menthene, dihydroterpinolene, dihydrodipentene, α-terpinene, γ-terpinene, α-phellandrene, pseudolimonene, limonene, d-limonene, l-limonene, d,l-limonene, isolimonene, terpinolene, isoterpinolene, β-phellandrene, β-terpinene, cyclogeraniolane, pyronane, α-cyclogeraniolene, β-cyclogeraniolene, γ-cyclogeraniolene, methyl-γ-cyclogeraniolene, cyclodihydromyrcene, α-pyronene, β-pyronene, γ-ypyronene, 1-ethyl-5,5-dimethyl-1,3-cyclohexadiene, 2-ethyl-6,6-dimethyl-1,3-cyclohexadiene, 2-ρ-menthene, 1(7)-ρ-menthene, 2,4-ρ-menthadiene, 2,5-ρ-menthadiene, 1(7),4(8)-ρ-menthadiene, 3,8-ρ-menthadiene, 1,2,3,5-tetramethyl-1,3-cyclohexadiene, 1,2,4,6-tetramethyl-1,3-cyclohexadiene, 1,6,6-trimethylcyclohexene, 1,1-dimethylcyclohexane and other monocyclic terpene derivatives.

21. The process of claim 17, in which said bicyclic terpene of the heat transfer fluid is selected from the group of bicyclic terpenes consisting of the following:

norsabinane, northujene, 5-isopropylbicyclo hex-2-ene, thujane, β-thujene, α-thujene, sabinene, 3,7-thujadiene, norcarane, 2-norcarene, 3-norcarene, 2,4-norcaradiene, carane, 2-carene, 3-carene, β-carene, nonpinane, 2-norpinene, apopinane, apopinene, orthodene, norpadiene, homopinene, pinane, 2-pinene, 3-pinene, β-pinene, verbenene, homoverbanene, 4-methylene-2-pinene, norcamphane, apocamphane, camphane, α-fenchane, α-fenchene, santenane, santane, norcamphene, camphenilane, fenchane, isocamphane, β-fenchane, camphene, β-fenchene, 2-norbornene, apobornylene, bornylene, 2,7,7-trimethyl-2-norbornene, santene, 1,2,3-trimethyl-2-norbornene, isocamphodiene, camphenilene, isofenchene, 2,5,5-trimethyl-2-norbornene and other bicyclic terpene derivatives.

22. The process of claim 17, wherein the heat transfer fluid being the terpene mixture comprising at least one monocyclic terpene and at least one bicyclic terpene, in which said monocyclic terpene is selected from the group of monocyclic terpenes consisting of the following:

ρ-menthane, carvomenthene, menthene, dihydroterpinolene, dihydrodipentene, α-terpinene, γ-terpinene, α-phellandrene, pseudolimonene, limonene, d-limonene, l-limonene, d,l-limonene, isolimonene, terpinolene, isoterpinolene, β-phellandrene, β-terpinene, cyclogeraniolane, pyronane, α-cyclogeraniolene, β-cyclogeraniolene, γ-cyclogeraniolene, methyl-γ-cyclogeraniolene, cyclodihydromyrcene, α-pyronene, β-pyronene, γ-pyronene, 1-ethyl-5,5-dimethyl-1,3-cyclohexadiene, 2-ethyl-6,6-dimethyl-1,3-cyclohexadiene, 2-ρ-menthene, 1(7)-ρ-menthene, 2,4-ρ-menthadiene, 2,5-ρ-menthadiene, 1(7),4(8)-ρ-pmenthadiene, 3,8-ρ-menthadiene, 1,2,3,5-tetramethyl-1,3-cyclohexadiene, 1,2,4,6-tetramethyl-1,3-cyclohexadiene, 1,6,6-trimethylcyclohexene, 1,1-dimethylcyclohexane and other monocyclic terpene derivatives, and where the at least one bicyclic terpenes is selected from the group of bicyclic terpenes consisting of the following:

norsabinane, northujene, 5-isopropylbicyclo hex-2-ene, thujane, β-thujene, α-thujene, sabinene, 3,7-thujadiene, norcarane, 2-norcarene, 3-norcarene, 2,4-norcaradiene, carane, 2-carene, 3-carene, β-carene, nonpinane, 2-norpinene, apopinane, apopinene, orthodene, norpadiene, homopinene, pinane, 2-pinene, 3-pinene, β-pinene, verbenene, homoverbanene, 4-methylene-2-pinene, norcamphane, apocamphane, camphane, α-fenchane, α-fenchene, santenane, santane, norcamphene, camphenilane, fenchane, isocamphane, β-fenchane, camphene, β-fenchene, 2-norbornene, apobornylene, bornylene, 2,7,7-trimethyl-2-norbornene, santene, 1,2,3-trimethyl-2-norbornene, isocamphodiene, camphenilene, isofenchene, 2,5,5-trimethyl-2-norbornene and other bicyclic terpene derivatives.

23. The process of claim 22, in which the heat transfer fluid comprises about 10% to 90% by volume of the at least one monocyclic terpene and about 90% to 10% by volume of the at least one bicyclic terpene.

24. The process of claim 23, in which the heat transfer fluid comprises about 34% to 90% by volume of the at least one monocyclic terpene and about 66% to 10% by volume of the at least one bicyclic terpene.

25. The process of claim 22, in which the heat transfer fluid comprises a mixture of at least one monocyclic terpene selected form the group consisting of d-limonene, terpinolene, α-terpinene, γ-terpinene and at least one bicyclic terpene selected from the group consisting of 3-carene, sabinene, α-pinene and camphene.

26. The heat transfer fluid of claim 14, in which the heat transfer fluid is comprised of only a single bicyclic terpene which is selected from the pinane bicyclic terpene family type.

* * * * *